July 14, 1931. J. H. FULMER 1,814,683
FEEDING DEVICE
Filed April 24, 1930 2 Sheets-Sheet 1
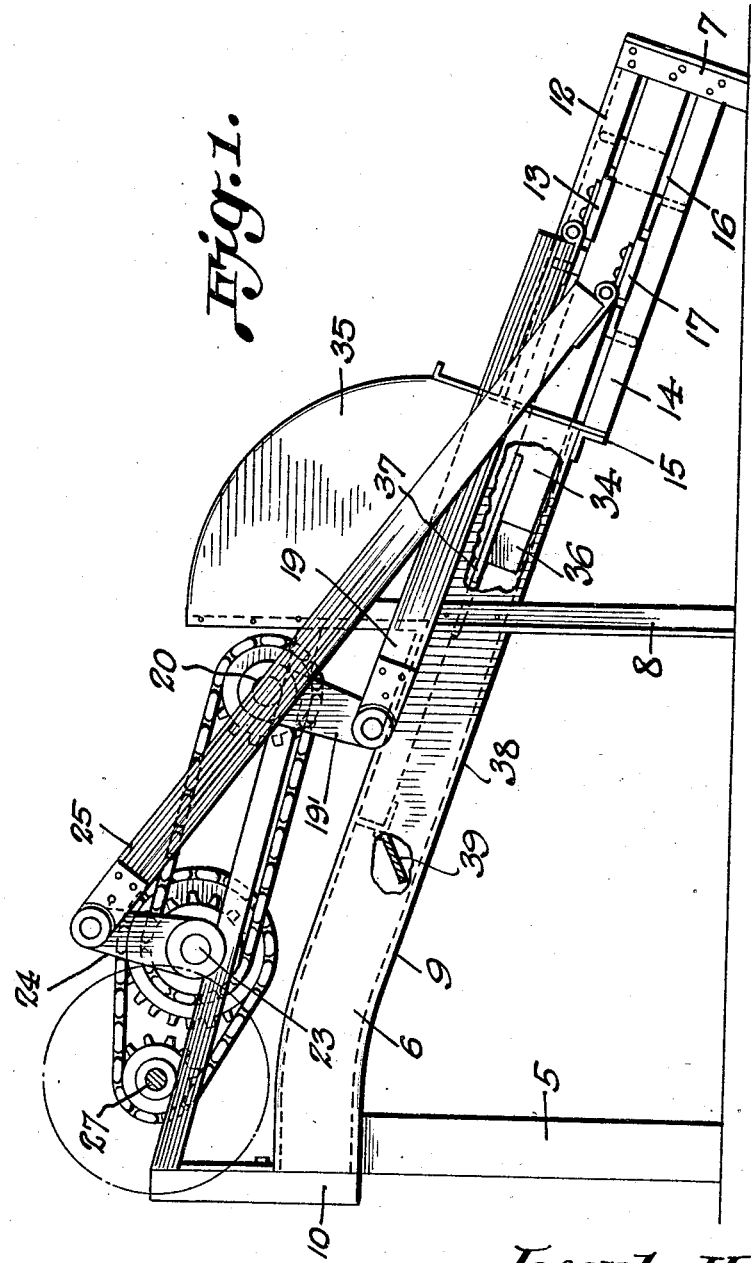
Joseph H. Fulmer
Inventor
By C. A. Snow & Co.
Attorneys.

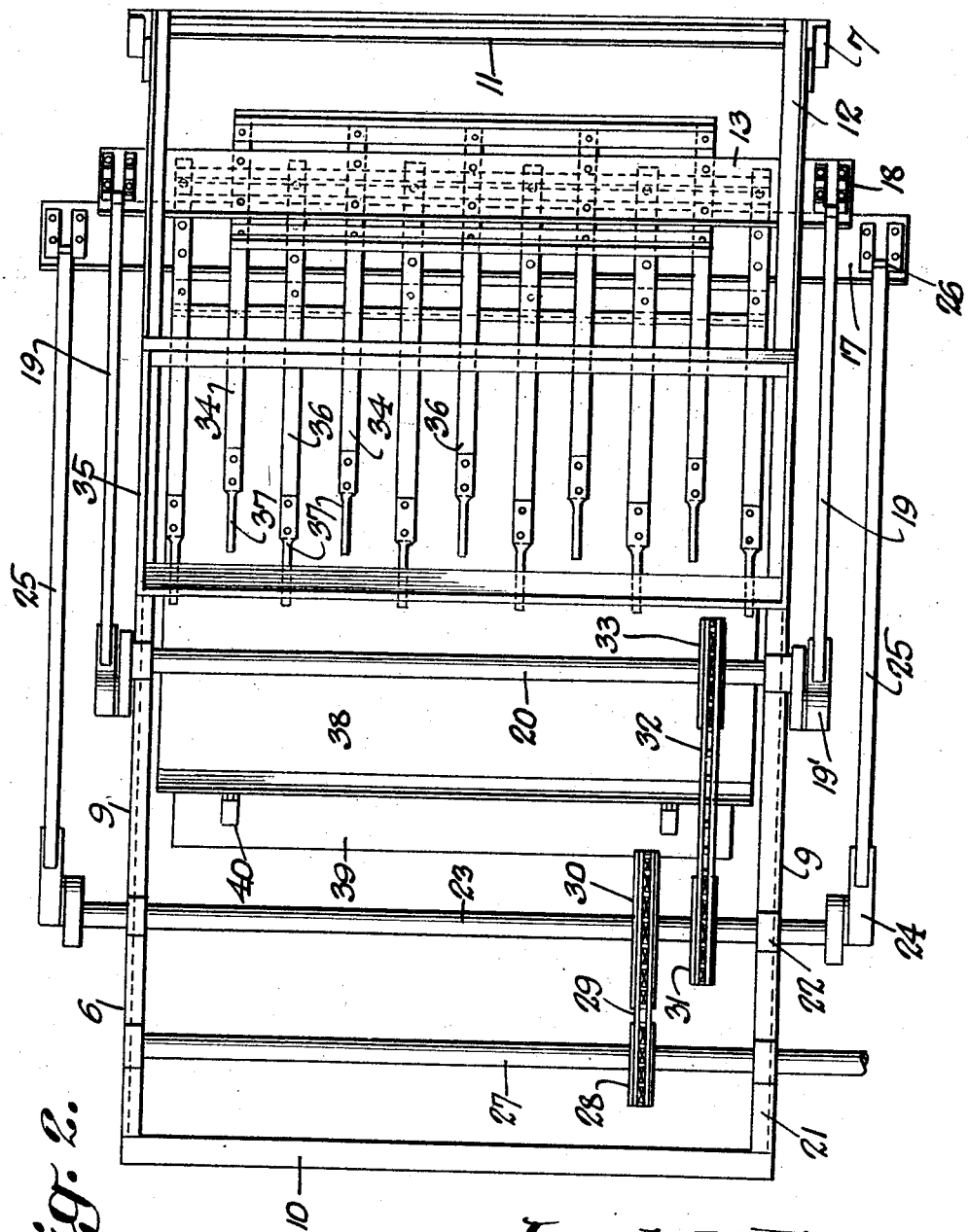

Patented July 14, 1931

1,814,683

UNITED STATES PATENT OFFICE

JOSEPH H. FULMER, OF NAZARETH, PENNSYLVANIA

FEEDING DEVICE

Application filed April 24, 1930. Serial No. 447,050.

This invention relates to a device for use in feeding green forage crop materials onto an endless conveyor, forming a part of a drying and curing apparatus constituting the subject matter of my copending application filed November 7, 1928, Serial No. 317,867.

The primary object of the invention is to provide a device of this character so constructed that the green forage crop material fed into the machine will be formed into a ribbon of uniform thickness, width and density to facilitate the curing operation.

Another object of the invention is the provision of plungers so constructed that they will pick up small quantities of the material under treatment, to force them forwardly into the compressing or forming chamber of the device, to insure the formation of a ribbon of uniform size throughout its length.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a feeding device constructed in accordance with the invention.

Figure 2 is a plan view thereof.

Referring to the drawings in detail, the device comprises a body portion supported at one of its ends, by means of the leg members 5, which leg members are substantially long so that the body portion, which is indicated by the reference character 6, is supported in an inclined position, the upper end thereof being disposed so that material fed from the device, will fall onto an endless conveyor not shown. The opposite end of the body portion is supported by means of the leg members 7, while the intermediate portion thereof is supported by means of the leg members 8 that are secured to the sides of the body portion.

The body portion 6 is formed of side members 9 that are connected at their forward ends by means of the cross bar 10 that extends an appreciable distance above the upper edges of the side members 9, as clearly shown by Figure 1 of the drawings. The lower ends of the side members are connected by means of the angle bar 11. Secured to the body portion at the lower end thereof, are angle bars 12 that extend in parallel spaced relation with the upper edges of the side members 9, providing a guide for the bar 13, forming a part of one of the feeding members.

Bars 14 are secured to the leg members 7 and the angle bars 15 that are secured to the side members 9, the bars 14 being also disposed in spaced relation with the lower sides of the members 9 providing lateral guides 16, for the bar 17, forming a part of another feeder that operates in conjunction with the first mentioned plunger or feeding member.

The bar 13 has its ends extended beyond the sides of the body portion, where they are provided with bearing members 18 to which the connecting rods 19 are connected, the opposite ends of the connecting rods being connected to the arms 19' secured to the outer ends of the shaft 20, which is mounted in bearings secured to the upper surfaces of the supporting bars 21 that are mounted directly above the side members 9 of the body portion.

Bearings 22 are also mounted on the supporting bars 21, and accommodate the shaft 23 that carries arms 24 at its outer ends. The reference character 25 designates connecting bars that connect the arms 24 to the bar 17, through the medium of the bearings 26. Thus it will be seen that due to this construction, sliding movement is imparted to the bars 13 and 17, to accomplish the purpose of the invention.

A power shaft 27 is also mounted on the frame and is supplied with a sprocket 28 over which the chain 29 operates, the chain 29 also operating over the sprocket 30 mounted on the shaft 23, to transmit rotary movement from the shaft 27 to the shaft 23. Sprocket 31 is secured to the shaft 23 and transmits motion to the shaft 20, through the medium of the chain 32 and sprocket 33.

Secured to the bar 13, are bars 34, which extend forwardly into the body portion, in spaced relation with each other, the lengths of the bars 34 being such that they will move under the hopper 35, to engage the material fed into the hopper, to force the material forwardly through the body portion.

Bars 36 are secured to the bar 17 and are arranged between the bars 34 so that the bars 36 will contact with the material that falls between the bars 34. At the free ends of the bars 34 and 36, are fingers 37 that are designed to be forced into the material to carry the material through the machine.

The reference character 38 designates the forming or compressing chamber, which embodies side walls and an upper wall spaced apart in such a way that material forced through the chamber 38 will be formed into a ribbon of uniform thickness, width and density to facilitate the curing of the material, which is passed into the curing apparatus, not shown.

Pivotally mounted at one end of the chamber 38, is a hinged bar 39, which extends throughout the width of the chamber 38 so that material which has passed from the forming chamber 38 cannot return upon the return movement of the plungers.

Springs 40 engage the bar 39 and normally urge the bar 39 to its closed position.

It might be further stated that due to the construction of the device, the bars 13 and 17 move in opposite directions, with the result that the fingers of one bar pick up the material and press the material forwardly into the forming or compressing chamber, while the other bar is moving in the opposite direction, thereby insuring a continuous feeding of the material to the forming or compressing chamber.

I claim:

1. A device for conditioning forage material for curing purposes, comprising an inclined body portion formed of spaced upper and lower walls, said body portion having a restricted portion providing a forming chamber, reciprocating members operated in the body portion, a hopper for directing material to the body portion, and means for operating the reciprocating members to force material through the body portion.

2. A device for conditioning forage material for curing purposes, comprising an elongated body portion having longitudinal upper and lower slots in the sides thereof, bars disposed transversely of the body portion and having their ends disposed in the slots, sets of bars extending forwardly from the first mentioned bars and extending in parallel spaced relation with each other, and means for operating the sets of bars intermittently to feed material through the body portion.

In testimony that I claim the foregoing as my own, I have hereto affixed my signature.

JOSEPH HENRY FULMER.